(12) United States Patent
Sato et al.

(10) Patent No.: US 7,837,108 B2
(45) Date of Patent: Nov. 23, 2010

(54) SENSOR DEVICE MANAGEMENT SYSTEM AND METHOD

(75) Inventors: Yoshitaka Sato, Yokohama (JP); Kei Takeda, Kawasaki (JP); Takaaki Yayoi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1098 days.

(21) Appl. No.: 11/512,123

(22) Filed: Aug. 30, 2006

(65) Prior Publication Data

US 2007/0296549 A1 Dec. 27, 2007

(30) Foreign Application Priority Data

Jun. 22, 2006 (JP) .............................. 2006-172066

(51) Int. Cl.
*G06K 7/00* (2006.01)
(52) U.S. Cl. .................... 235/440; 340/10.1; 340/10.41; 340/10.51; 340/572.1; 705/28
(58) Field of Classification Search ................. 235/440; 340/10.1, 10.41, 10.51, 572.1; 705/28
See application file for complete search history.

(56) References Cited

U.S. PATENT DOCUMENTS

| | | | | |
|---|---|---|---|---|
| 2004/0143505 A1* | 7/2004 | Kovach | ....................... | 705/23 |
| 2006/0058987 A1 | 3/2006 | Kumar et al. | | |
| 2006/0080190 A1* | 4/2006 | Furukawa et al. | ............. | 705/28 |
| 2007/0271113 A1* | 11/2007 | Nelson et al. | .................. | 705/1 |
| 2008/0111660 A1* | 5/2008 | Kim et al. | .................. | 340/5.86 |
| 2008/0284571 A1* | 11/2008 | Wilbrink et al. | ........... | 340/10.1 |
| 2009/0234587 A1* | 9/2009 | Hsiung et al. | ................. | 702/22 |
| 2009/0237222 A1* | 9/2009 | Muirhead | ................ | 340/10.51 |

FOREIGN PATENT DOCUMENTS

| | | |
|---|---|---|
| JP | 2004-533034 | 10/2004 |
| JP | 2005-352000 | 12/2005 |
| JP | 2006-072975 | 3/2006 |
| WO | WO 02/069300 | 9/2002 |

\* cited by examiner

*Primary Examiner*—Allyson N Trail
(74) *Attorney, Agent, or Firm*—Antonelli, Terry, Stout & Kraus, LLP.

(57) ABSTRACT

An "inter-reader rule extracting portion" is provided to extract rules existing among the sets of ID acquired by the respective readers. In addition, the state in which a predetermined number of rules are invalid is defined as the time to change the service, and at the time of changing the service, the latest rules produced by an "inter-reader rule re-constructing portion" that reconstructs rules are used to monitor a system.

6 Claims, 11 Drawing Sheets

FIG.7

SYSTEM DEFINITION MANAGEMENT TABLE (710) — 243

| DEFINITION ID | ITEMS ~720 | DEFINITION VALUES ~730 |
|---|---|---|
| 1 | PROCESSING TYPE ~721 | OVERLAP RATIO CHECK |
| 2 | COMBINATION DEVICE NUMBER ~722 | 2 |
| 3 | ALLOWANCE OF DATA ~723 | ±5% |
| 4 | CONDITION FOR VALID RULE ~724 | OVERLAP OF 30% OR ABOVE |
| 5 | RECONSTRUCTION CONDITION ~725 | 60% OR ABOVE IS INVALID |
| 6 | DEVICE FLUCTUATION CONDITION ~726 | ACQUIRE ALL DATA IN 180 SECONDS |
| ... | ... | ... |

FIG.8

DEVICE MANAGEMENT TABLE (810) — 244

| ITEM NUMBER | DEVICE ID ~820 | NAMES OF SENSOR DEVICES ~830 |
|---|---|---|
| 1 | S1 | READER A |
| 2 | S2 | READER B |
| 3 | S3 | READER C |
| 4 | S4 | READER D |

FIG.9

PROCESSING TYPE MANAGEMENT TABLE (910) — 245

| TYPE ID | TYPE NAMES ~920 | FORMULAS ~930 |
|---|---|---|
| T1 | OVERLAP RATIO CHECK ~921 | LOGICAL PRODUCT / LOGICAL SUM × 100 |
| T2 | NON-OVERLAP RATIO CHECK ~922 | EXCLUSIVE LOGICAL SUM / LOGICAL SUM × 100 |
| T3 | T1 & T2 ~923 | LOGICAL PRODUCT / LOGICAL SUM × 100 & EXCLUSIVE LOGICAL SUM / LOGICAL SUM × 100 |
| ... | ... | ... |

FIG.10

PRIMARY DATA MANAGEMENT TABLE — 246

| DEVICE ID ~1010 | TAG IDENTIFICATION INFORMATION ~1020 |
|---|---|
| S1 | 1 |
| S1 | 2 |
| S1 | 3 |
| S2 | 2 |
| S2 | 3 |

FIG.11

PROCESSING LOGIC MANAGEMENT TABLE — 247

| LOGIC ID 1110 | TYPE ID 1120 | COMBINATION DEVICE ID ~1130 | |
|---|---|---|---|
| | | SENSOR DEVICE A ~1140 | SENSOR DEVICE B ~1150 |
| L1 ~1111 | T1 | S1 | S2 |
| L2 ~1112 | T1 | S1 | S3 |
| L3 ~1113 | T1 | S1 | S4 |
| L4 | T1 | S2 | S3 |
| L5 | T1 | S2 | S4 |
| L6 | T1 | S3 | S4 |

FIG.12

PROCESSED DATA MANAGEMENT TABLE — 248

| DATA ID ~1210 | LOGIC ID ~1220 | VALUES ~1230 |
|---|---|---|
| D1 | L1 | 66 |
| D2 | L2 | 43 |
| D3 | L3 | 0 |
| D4 | L4 | 50 |
| D5 | L5 | 0 |
| D6 | L6 | 34 |

FIG.13

CANDIDATE RULE MANAGEMENT TABLE — 249

| CANDIDATE RULE ID ~1310 | LOGIC ID ~1320 | VALUES ~1330 |
|---|---|---|
| CR1 | L1 | 66 |
| CR2 | L2 | 43 |
| CR3 | L3 | 0 |
| CR4 | L4 | 50 |
| CR5 | L5 | 0 |
| CR6 | L6 | 34 |

FIG.14

REGISTERED RULE MANAGEMENT TABLE — 250

| RULE ID ~1410 | LOGIC ID ~1420 | VALUES ~1430 |
|---|---|---|
| R1 | L1 | 61 ~ 71% |
| R2 | L2 | 38 ~ 48% |
| R3 | L4 | 45 ~ 55% |
| R4 | L6 | 29 ~ 39% |

FIG.16

PROCESSED DATA MANAGEMENT TABLE 248

| DATA ID 1610 | LOGIC ID 1620 | VALUES 1630 | |
|---|---|---|---|
| | | MINIMUM VALUES 1640 | MAXIMUM VALUES 1650 |
| D1 | L1 | 60 | 70 |
| D2 | L2 | 41 | 45 |
| D3 | L3 | 0 | 0 |
| D4 | L4 | 47 | 51 |
| D5 | L5 | 0 | 0 |
| D6 | L6 | 33 | 36 |

FIG.17

REGISTERED RULE MANAGEMENT TABLE 250

| RULE ID 1410 | LOGIC ID 1420 | VALUES 1430 |
|---|---|---|
| R1 | L1 | 55 ~ 75% |
| R2 | L2 | 36 ~ 50% |
| R3 | L4 | 42 ~ 56% |
| R4 | L6 | 28 ~ 41% |

SENSOR DEVICE MANAGEMENT SYSTEM AND METHOD

INCORPORATION BY REFERENCE

This application relates to and claims priority from Japanese Patent Application No. 2006-172066 filed on Jun. 22, 2006, the entire disclosure of which is incorporated herein by reference.

BACKGROUND

The present invention relates to a sensor device management system and method for a ubiquitous information system that uses sensor devices and individual identifiers to manage information of articles.

A ubiquitous information system has been built up that can make it possible to refer to the field information that could not hitherto be taken in the conventional information system. This system employs a combination of sensor devices and individual identifiers such as RFID tags that can also be understood by the terms of RFID (Radio Frequency Identification) and sensor nodes.

The term RFID is the technology for transmitting and receiving the information stored in the IC tags between the RFID readers and the IC tags, or RFID tags wirelessly, or by way of radio waves or electromagnetic waves. These readers and tags have features of non-contact data-reading/writing ability and invulnerability to contaminant or dust. This technology is applied to the fields for the recognition and management of articles. The general RFID system is comprised of a plurality of IC tags having individual identification information, and RFID readers that read out, or acquire the individual information from the IC tags by using wireless interfaces. Since radio waves are used for the transmission and reception of information between the RFID readers and the IC tags, the communication distances between them depends on the frequency of the radio waves. The individual identification information stored in each of the IC tags is made unique within this system. In addition, the non-contact power transmission technique for supplying power from the antenna side makes it possible to use the IC tags that do not need any battery and thus that can be semi-permanently used.

However, the sensor devices having wireless interfaces sometimes cannot correctly read out the field information due to the interference of radio waves and to the failure of hardware (hereinafter, this phenomenon is called the device level error). The ubiquitous information system has so far acquired information of objects in various places that could not be taken in the information system, and thus it generally needs a large number of sensor devices. Therefore, the device level error occurs in the whole system at a considerably high probability, and thus it is necessary to build up a system that considers this device level error.

There is an inventory control system as an example of the system that uses RFID readers as sensor devices and RFID tags as individual identifiers (for example, see JP-B-2004-533034).

SUMMARY

In the prior art of document JP-A-2005-352000, failure detection is made of the hardware of particular RFID readers and RFID tags. In this method, however, the detection of failure cannot be performed under the condition that the reference to data cannot be made due to the change of ambient communication environment and to the change of directivity. Thus, the detectable range of the device level error is narrow.

The prior art of document JP-B-2004-533034 is the technique of acquiring data from a plurality of information sources and automatically analyzing the data to produce value-added data, which is then accumulated and redistributed. The rule for the analysis must be previously defined.

In the system in which a plurality of RFID readers are used to redundantly monitor articles, there often exist "groups of sensor devices that have acquired identification information including redundant information, or information overlaps of more than a constant rate." (Hereinafter, such group of sensor devices extracted as to meet a predetermined condition based on the identification information acquired by a plurality of sensor devices is called the rule.) Then, if this rule is found invalid, it is considered that the device level error occurs in any one of the RFID readers that constitute the rule. Thus, this rule may be used to find the device level error in any one of the RFID readers. However, in the system for monitoring the number of articles by using RFID readers, a great number of RFID readers are used, and thus a large number of rules appear. In addition, since the RFID readers are changed in their locations due to the change of the system alteration, it is considered that the rules are frequently changed. Under this situation, it is difficult for manpower to generate, register and change the rules. In addition, erroneous setting and loss of registration will occur.

In order to solve the above problems, there is provided an "inter-reader rule extracting portion" that automatically extracts the rules on the basis of the sets of individual identification information acquired by the sensor devices when the system correctly operates. This portion enables even the system using a large number of sensor devices to automatically extract the rules. In addition, if the state in which a predetermined number of rules are invalid is defined as the change of service, the system can monitor the readers by using the latest rules produced by an "inter-reader rule reconstructing portion" for reconstructing rules at the time of the change of service.

Since the rules can be automatically extracted in the embodiments of the invention, it is possible to produce the rules that were difficult in the prior art. Thus, it is possible to find the device level error occurring in the system.

In addition, since rules are again extracted when the number of invalid rules exceeds a certain number, the system in which the service and environment often change can monitor the readers under the most suitable rules.

Other objects, features and advantages of the invention will become apparent from the following description of the embodiments of the invention taken in conjunction with the accompanying drawings.

BRIEF DESCRIPTION OF THE DRAWINGS

FIG. 7 shows an example of the data structure of a system definition management table.

FIG. 8 shows an example of the data structure of a device management table.

FIG. 9 shows an example of the data structure of a processing type management table.

FIG. 10 shows an example of the data structure of a primary data management table.

FIG. 11 shows an example of the data structure of a processing logic management table.

FIG. 12 shows an example of the data structure of a processed data management table.

FIG. 13 shows an example of the data structure of a candidate rule management table.

FIG. 14 shows an example of the data structure of a registered rule management table.

FIG. 16 shows an example of the data structure of the processed data management table considering the device fluctuation condition.

FIG. 17 shows an example of the data structure of the registered rule management table considering the device fluctuation condition.

DESCRIPTION OF THE EMBODIMENTS

Embodiments of the invention will be described with reference to the drawings.

Embodiment 1

Figure 1:
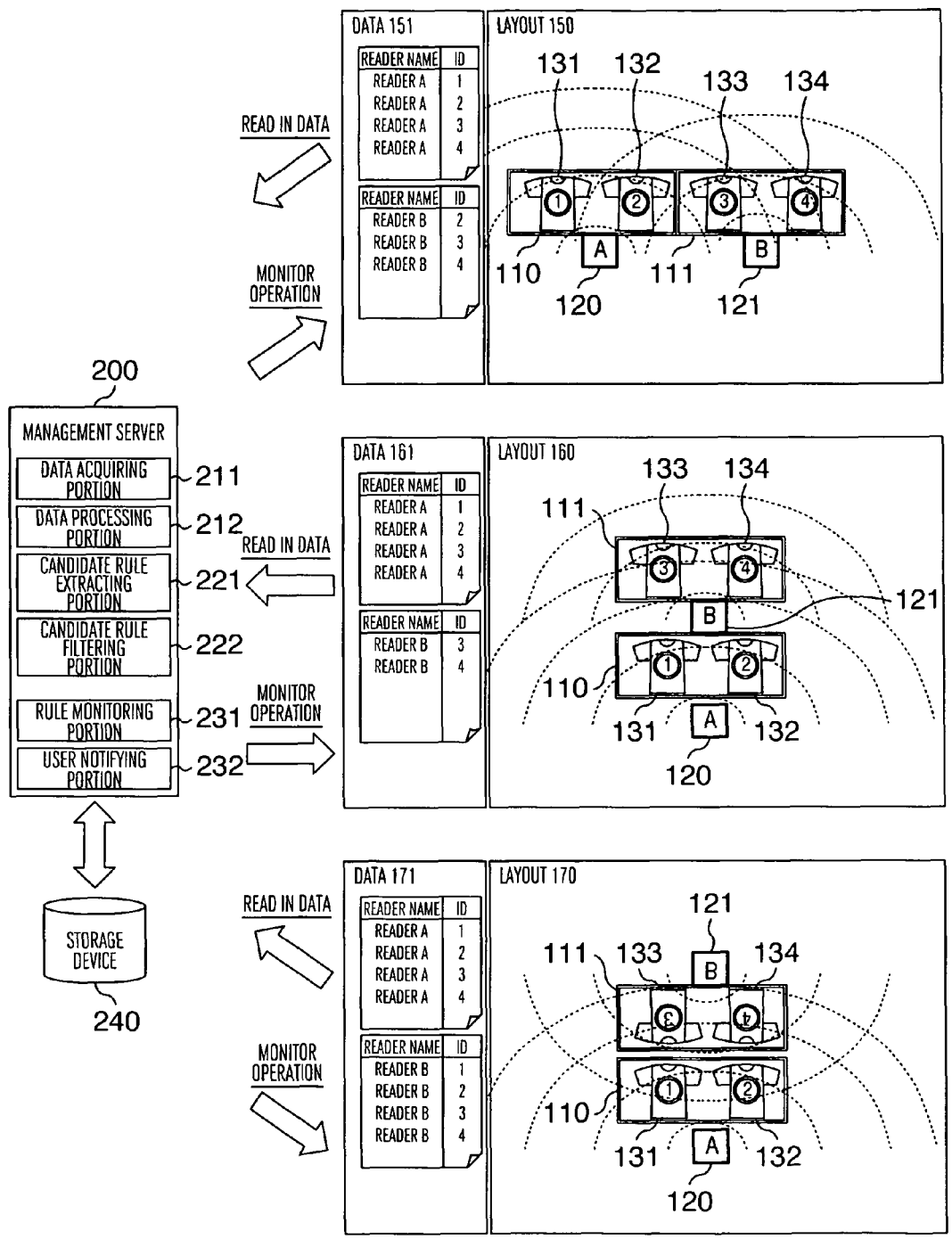
FIG. 1 shows an example of a sensor device management system.

FIG. 1 shows an example of a sensor device management system using RFID readers as sensor devices and RFID tags as individual identifiers. The sensor devices and individual identifiers are frequently changed in their positional relations depending upon layouts 150, 160 and 170.

The layouts 150, 160 and 170 show the situations in which the sensor devices 120 and 121 are respectively used to acquire data 151, 161 and 171 from articles 131 through 134 with RFID tags attached that are placed on shelves 110 and 111.

The sensor devices wirelessly acquire individual identification information from the REID tags, but the communication ranges between the sensor devices and the RFID tags are limited in dependence upon the communicable distance of the radio waves.

In the layout 150, the shelves 110 and 111 are arranged laterally, or in series, and in the layout 160, the shelves are arranged vertically, or in parallel. In the layout 170, the shelves are arranged in parallel but in opposition to each other. From data 151, 161 and 171, it will be seen that, even if the same-performance sensor devices and RFID tags are used, changing of the layout will result in different data being obtained by the sensor devices due to their directivity and communicable distance.

A data acquiring portion 211 of a management server 200 causes the data 151, 161 or 171 acquired by the sensor devices 120 and 121 to be registered in a storage device 240.

A candidate rule extracting portion 221 and candidate rule filtering portion 222 of the server 200 read out data from the storage device 240, automatically extract the rules and processing logics for monitoring the device level error and register them in the storage device 240. While the candidate rule filtering portion 222 and candidate rule extracting portion 221 are separately provided in this embodiment, the candidate rule extracting portion 221 may be constructed to act both as the candidate rule filtering portion 222 and as its own portion.

A data processing portion 212 of the server 200 produces processed data corresponding to each rule by using the data and processing logics that are acquired by the sensor devices and stored in the storage device 240.

A rule monitoring portion 231 of the server 200 acquires the registered rules from the storage 240 and uses the rules to check if the device level error is occurring in the sensor devices 120 and 121. For example, according to the data 151~171 acquired from the layouts, the data acquired by the sensor devices 120 and 121 contains 75%, 50% and 100% of redundancies, or overlaps of ID between the sensor devices 120 and 121. In the example of data 161, the reader A, or 120 communicates with the RFID tags of ID 1, 2, 3 and 4 to acquire the individual identification information ID 1, 2, 3 and 4, and the reader B, or 121 communicates with the RFID tags of ID 3 and 4 to acquire the individual identification information ID 3 and 4. Of the acquired information, information of ID 3 and 4 acquired by reader B are the same as, or the overlaps on those acquired by reader A. The ratio of the overlaps of ID 3 and 4 to all ID information becomes 50% (two ID of four ID have overlaps, or redundancies between the readers A and B).

Since it can be considered that the device level error occurs when the overlaps of data are not formed, or invalid, the system monitors this ratio, or overlap ratio of ID to check to see if the device level error is occurring in the sensor devices 120 and 121. If, for example, the reader B fails under the condition that the overlap ratio of ID in data 161 is normally kept 50% between readers A and B, the reader B cannot keep communicating with the RFID tags, and thus the overlap ratio of ID changes from 50% to 0%.

Thus, if monitoring is made of whether the overlap ratio is significantly changed, it is possible to detect that the device level error has occurred in any one of the readers A and B. In addition, if monitoring is made of the ID information of RFID tags acquired by the group of sensor devices between which the overlap ratio of ID has been changed, it is possible to judge whether the device level error has occurred in any one of the readers of this group.

For example, as in the previous example, if it is detected that the overlap ratio of ID has been changed between the readers A and B of the group, and if collection is made of the individual identification information, or ID of RFID tags acquired by the readers A and B, it is possible to detect that the reader B has failed.

Figure 2:
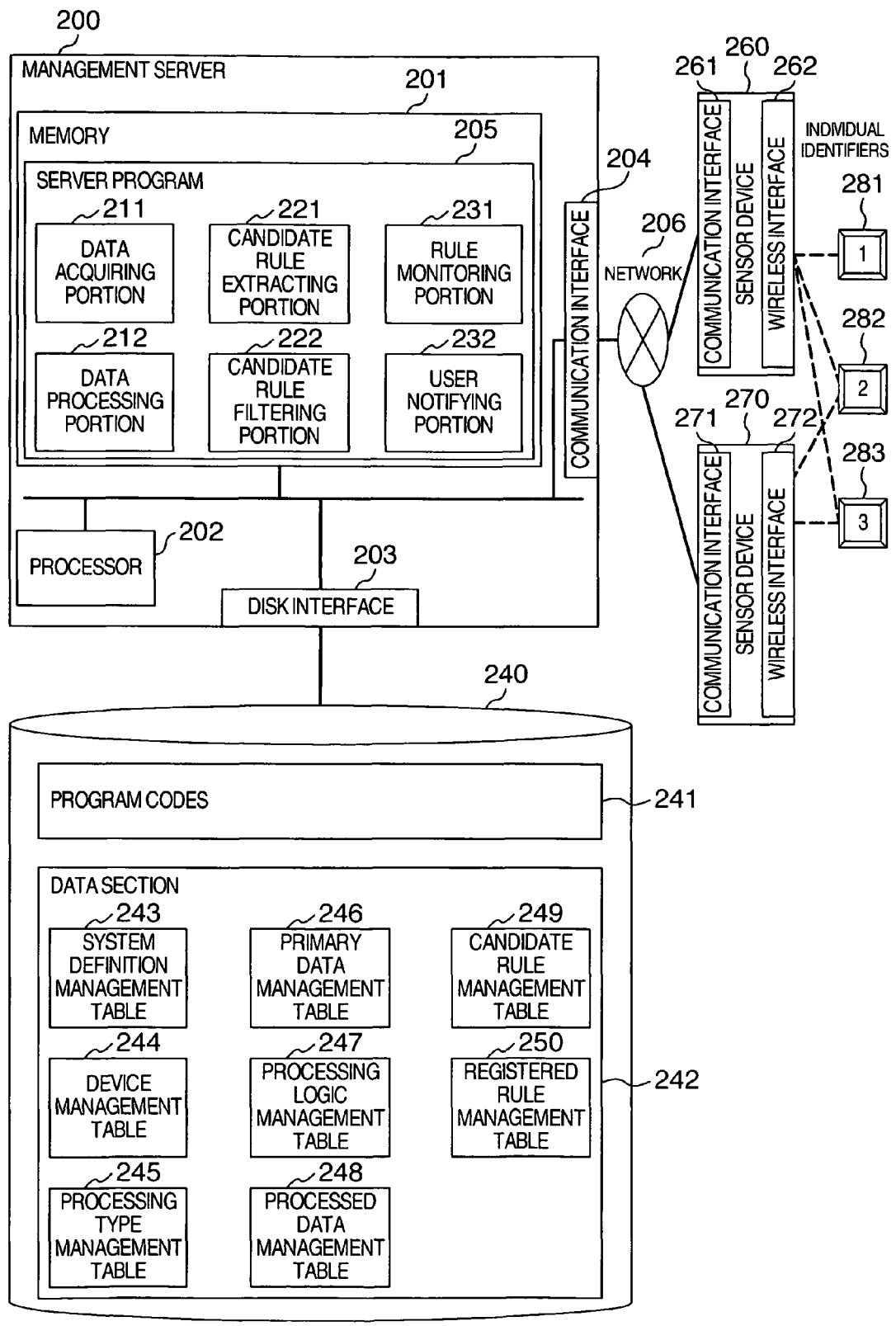
FIG. 2 is a block diagram of an example of the whole construction of an embodiment of the invention.

FIG. 2 shows an example of the whole construction of the operation management server 200. This system can be comprised of, for example, a plurality of sensor devices 260, 270, a plurality of individual identifiers 281 through 283, the operation management server 200 and the storage device 240. While the sensor devices 260 and 270 are of the same specification in the embodiment as described below, they may be of different specifications. In addition, the individual identifiers 281 through 283 may be hardware devices of different specifications. The number of the sensor devices and that of the individual identifiers in the system may be increased according to the scale of the system.

The operation management server 200 has a memory 201 and a processor 202, and makes access to the storage device 240 through a disk interface 203. The server 200 is also connected to a network 206 such as the Internet through a communication interface 204.

The memory 201 is constructed by, for example, a RAM (Random Access Memory), and it has a server program 205 read in. The processor 202 is formed of a CPU (Central Processing Unit), and it executes the program stored in the memory 201.

The server program 205 has the data acquiring portion 211, the data processing portion 212, the candidate rule extracting portion 221, the candidate rule filtering portion 222, the rule monitoring portion 231 and a user notifying portion 232. Each portion will be described later in detail.

The sensor device 260 is formed of, for example, an RFID reader having a communication interface 261 and a wireless interface 262.

The individual identifiers 281 through 283 are each formed of, for example, an RFID tag holding data that contains individual identification information, or ID.

The sensor device 260 acquires the individual identification information of the individual identifiers 281~283 via the wireless interface 262, and it sends the information through the communication interface 261 to the operation management server 200.

In this case, the data of the individual identifiers may be acquired at intervals determined by a system definition management table 243, and the acquired data may be processed according to a predetermined rule, and then sent to the operation management server 200. The sensor device 270 is assumed to have the portion equivalent to that of the sensor device 260.

The storage device 240 is formed of, for example, hard disks. The storage device 240 has a program code 241 and a data section 242.

The data section 242 is comprised of the system definition management table 243, a device management table 244, a processing type management table 245, a primary data management table 246, a processing logic management table 247, a processed data management table 248, a candidate rule management table 249 and a registered rule management table 250. The data structure of each table will be described later.

The operation management server 200 causes the program code 241 to be read and stored in the memory 201 through the disk interface 203. The processor 202 is used to execute the program code, thereby achieving a plurality of portions 211 through 232. These portions, or data acquiring portion 211, candidate rule extracting portion 221, candidate rule filtering portion 222, data processing portion 212, rule monitoring portion 231 and user notifying portion 232 may be achieved not only by software, but also as an integrated circuit of processors by hardware.

FIG. 7 shows an example of the data structure of the system definition management table 243 that holds the definitions necessary for the system. Items 720 and definition values 730 manage the definitions of the system. The user defines each value of the system definition management table, and each value is used by the candidate rule extracting portion 221, candidate rule filtering portion 222 and rule monitoring portion 231.

Figure 4:
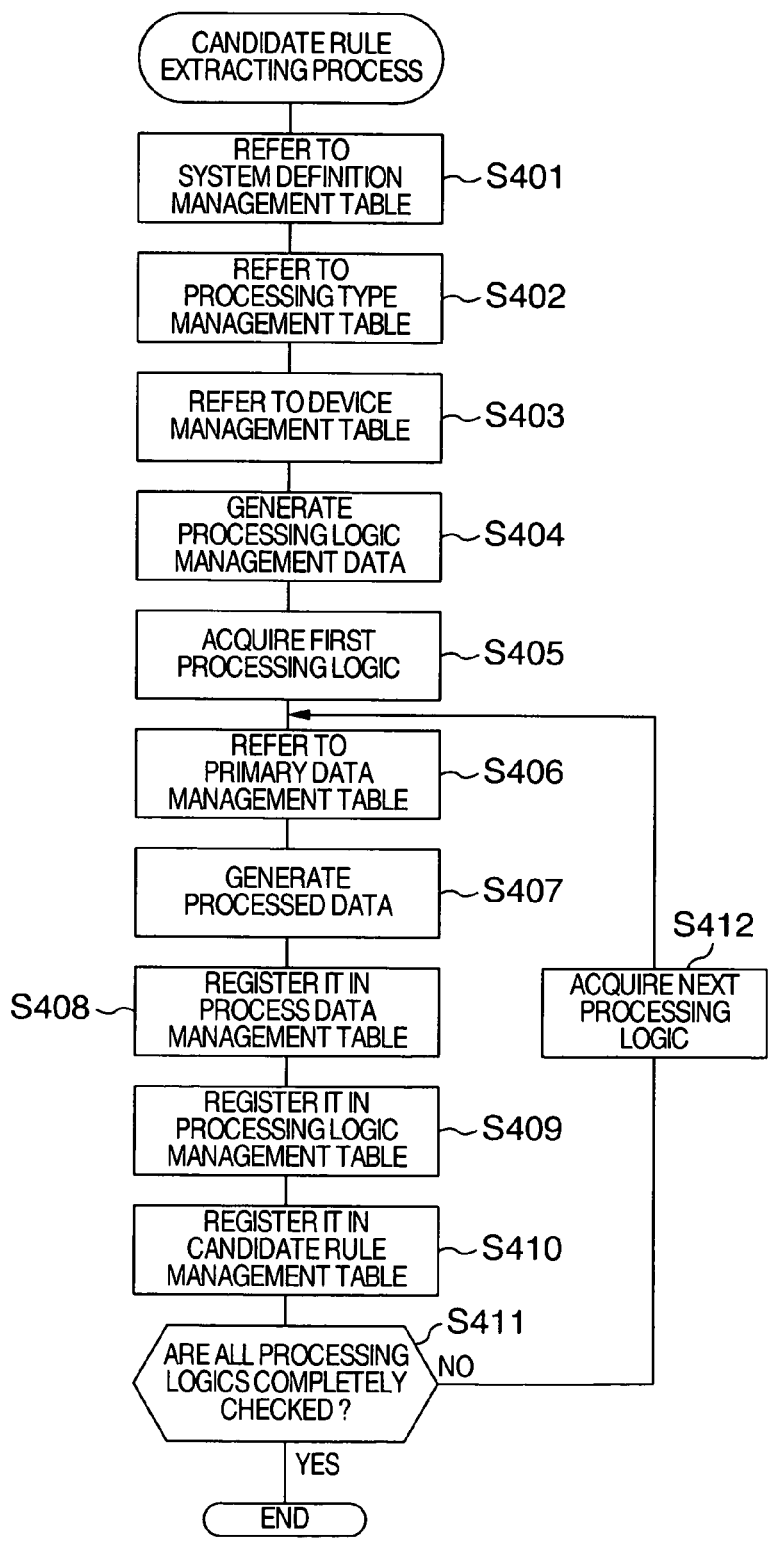
FIG. 4 is an example of the flowchart for a candidate rule generating process.

The processing type 721 provides a formula for calculation that is used for the data processing portion 212 to produce processed data in the candidate portion extracting process shown in FIG. 4. The formula is used to solve the relation between the pieces of data observed by a plurality of sensor devices. The relation between the pieces of data is, for example, "overlap ratio check" that is obtained when the logical product of individual identification information acquired by each sensor device is divided by the logical sum as the ratio of the same individual identification information to all information acquired by a plurality of sensor devices. In addition, there is another "non-overlap ratio check" that is obtained when the exclusive logical sum of the individual identification information acquired by each sensor device is divided by the logical sum as the ratio of the other information than the same acquired individual identification information to all information. Both the "overlap ratio check" and "non-overlap ratio check" may be used to provide the relation between the pieces of data.

The "overlap ratio check" is to find the ratio of the product set of the overlapped, or redundant individual identification information acquired by a plurality of sensor devices to the union of sets of the individual identification information acquired by the plurality of sensor devices.

In the field of definition values 730 corresponding to the processing type 721 is stored the corresponding value that is defined in the type ID 910 or type names 920 of the processing type management table 245 shown in FIG. 9. While the data acquired during the same time is used in this embodiment, the same relation may be derived from the data acquired by the sensor devices during different periods of time having a certain time difference.

The combination device number 722 is used for the candidate rule extracting process shown in FIG. 4 to produce the processing logic data. The processing logic data is stored in the processing logic management table 247, so that the values of type ID can be held in the table in association with a list of sensor devices and with formulas of data. Those values are used as input data necessary when the data processing portion 212 produces processed data.

FIG. 8 shows an example of the data structure of the device management table 244. The device management table 244 holds device ID 820 and device names 830 unique to the respective sensor devices within the table in order to manage the sensor devices existing within the system. The user, when constructing the system, defines the values held in the device management table, and the data acquiring portion 211 and candidate rule extracting portion 221 utilize those values.

FIG. 9 shows an example of the data structure of the processing type management table 245. This table holds type ID 910 and type names 920 for representing processing types, and formulas 930 corresponding to the respective types. The values in the processing type management table are previously defined within the system. The formulas 930 are used for the data processing portion 212 to process the data.

FIG. 10 shows an example of the data structure of the primary data management table 246. This table holds device ID 1010 unique to the respective devices and the acquired identification information, or tag ID 1020 that are acquired by the corresponding sensor devices. The values in the primary data management table are registered as shown on the basis of the values that the data acquiring portion 211 has acquired from the sensor devices.

FIG. 11 shows an example of the data structure of the processing logic management table 247. This table holds logic ID 110 unique within the table, type ID 1120 representing the processing types, and combination device ID 1140, 1150. While the data structure using two combination devices is shown in this embodiment, the number of devices to be combined is not limited to 2. The values of the processing logic management table are produced by the candidate rule extracting portion 221 and candidate rule filtering portion 222, and used by rule monitoring portion 231 and user notifying portion 232. The plurality of sensor devices are grouped according to this combination number.

FIG. 12 shows an example of the data structure of the processed data management table 248. This table holds data ID 1210 unique within the table, logic ID 1220 used to produce data, and values 1230. The values in the processed data management table are produced by the data processing portion 212. The timing of the production is not particularly limited to the timing of data acquisition from the sensor devices.

FIG. 13 shows an example of the data structure of the candidate rule management table 249. This table holds the candidate rule ID 1310, logic ID 1320 and values 1330 that are respectively unique within the table. The values in the candidate rule management table are produced by the candidate rule extracting portion 221 and used by the candidate rule filtering portion 222.

FIG. 14 shows an example of the data structure of the registered rule management table 250. This table holds the rule ID 1410, logic ID 1420 and values 1430 that are respectively unique within the table. The values in the registered rule management table are produced by the candidate rule filtering portion 222 and used by the rule monitoring portion 231 and user notifying portion 232.

The portions 211 through 232 to be achieved by the processor 202 will be described next. Although the processor 202 actually executes these portions according to the program, the portions 211 through 232 will be here described as performers for the convenience of explanation. In addition, when each portion is created by hardware, each processor of hardware may be operated as a performer.

The data acquiring portion 211 makes access to the sensor devices 260, 270 through the communication interface 204 to acquire the device ID 1010 unique to the sensor devices and the tag identification information 1020 that the sensor devices have produced. Then, this portion 211 confirms that the acquired device ID are defined as device ID in the device management table 244, and registers those acquired information in the primary data management table 246. If the sensor device 260 as device ID "S1" has acquired tag identification information "1", "2", "3" from the individual identifiers 281 through 283, respectively, the tag information "1", "2", "3" are registered as the acquired identification information of device ID "S1" in the primary data management table 246.

If the device identification information acquired from the sensor device is not device ID but device name, the data acquiring portion 211 refers to the device management table 244 to acquire the corresponding device ID. That is, if the device identification information acquired from the sensor device is the value, "reader A," of sensor device names 830, the portion 211 acquires the corresponding device ID "S1" as device ID. When data is acquired at certain intervals, the data that the data acquiring portion 211 registers in the primary data management table 246 is recognized as the data acquired during a certain time zone.

The data processing portion 212 refers to the processing logic management table 247 to acquire the value "T1" of type ID 1120, value "S1" of sensor devices A 1140 as a combination device and value "S2" of sensor devices B 1150 as the other combination device corresponding to the value "L1" of logic ID 1110.

Then, the data processing portion 212 refers to the processing type management table 245 to acquire the formula corresponding to the acquired value "T1" of type ID 1120 from the formula "logical product/logical sum×100" corresponding to the value "T1" of type ID 910.

In addition, the data processing portion 212 refers to the primary data processing table 246 to acquire the tag identification information "1", "2", "3" corresponding to the value "S1" of sensor devices A 1140 from the tag identification information 1020 corresponding to the value "S1" of device ID 1010. Similarly for the sensor device B it refers to this table to acquire the tag identification information "2", "3" corresponding to the value "S2" of device ID 1010.

The data processing portion 212 calculates the value "66" of processed data by using the formula "logical product/logical sum×100" and tag identification information acquired from sensor devices A and B. In other words, the "logical product/logical sum×100" is used to find the ratio, 66% of the product set "2" "3" of the individual identification information, or tag information associated with a plurality of sensor devices to the union of sets "1" "2" "3" of the tag information associated with the plurality of sensor devices.

While the number of combination devices is 2 in this embodiment, the values of processed data for the case of 3 or more combination devices may be calculated by the same procedure.

The data processing portion 212 generates "D1" as data ID 1210 unique within the processed data management table 248, and registers in the table 248 the "L1" of logic ID 1220 and "66" of values 1230 corresponding to the "D1".

The candidate rule extracting portion 221 and candidate filtering portion 222 actualize the rules to monitor the operation of sensor devices.

The candidate rule extracting portion 221 extracts candidate rules from the data stored in the primary data management table 246, and stores them in the candidate rule management table 249.

The candidate rule filtering portion 222 filters, or screens the candidate rules stored in the table 249 under certain conditions stored in the system definition management table 243, and stores the results in the registered rule management table 250. The details of each portion will be described later with reference to flowcharts.

Figure 3:
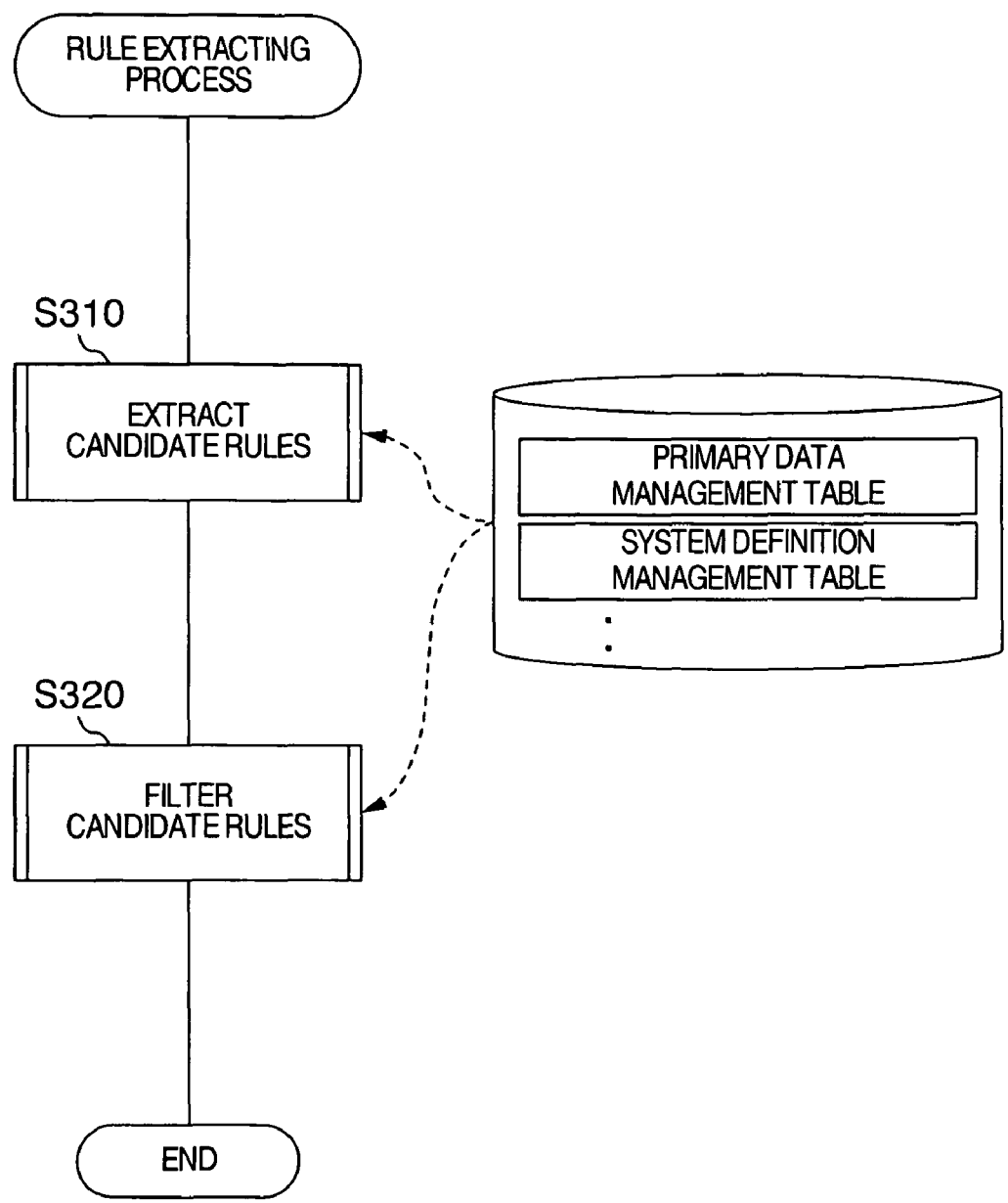
FIG. 3 is an example of the flowchart for a rule extracting process.

FIG. 3 shows an example of the flowchart for extracting the rules to monitor the operation of sensor devices. The procedure, or program for extracting rules has a step S310 as a candidate rule extracting process, and a step S320 as a candidate rule filtering process. Each process will be described later.

FIG. 4 shows an example of the flowchart for the candidate rule-extracting process corresponding to S310 of FIG. 3. The candidate rule extracting portion 221 provides steps S401 through S406, and steps S409 through S412. The data processing portion 212 provides steps S407 and S408.

The candidate rule extracting portion 221 refers to the system definition management table 243 shown in FIG. 7 to acquire the value "overlap ratio check" corresponding to processing type 721 and the value "2" corresponding to combination device number 722 (step S401).

The formula corresponding to the "overlap ratio check" of definition values 730 associated with processing type 721 is acquired from the "logical product/logical sum×100" of formulas 930 corresponding to the value "overlap ratio check" 921 of type names 920 of the processing type management table 245. When the processing type 721 acquired in the previous step is type name, the "T1" of type ID is acquired in addition to the formula (S402).

The list of "S1", "S2", "S3" and "S4" of device ID managed by the system is acquired from the device ID 820 of device management table 244 (S403).

The list of device combinations (S1, S2), (S1, S3), (S1, S4), (S2, S3), (S2, S4) and (S3, S4) is produced from the list of device ID obtained in the previous step and the definition value "2" corresponding to combination device number 722 (S404).

The candidate rule extracting portion 221 adds the type ID "T1" acquired in steps S401 or S402 to each device combination to produce processing logic management data L1 through L6, and registers them in the processing logic management table 247. While the definition value of combination device number 722 and the device number are respectively "2" and "4" in this embodiment, the device management table 244 may have registered therein m as device number and n as combination device number 722. In this case, the number of pieces of produced processing logic management data can be expressed by mCn. In addition, the definition value of the combination device number 722 may be used as the maximum so that the rules for the combinations less than n can be extracted from the data (S404).

The candidate rule extracting portion 221 executes steps S406 through S410 for each of the pieces of processing logic management data produced in steps S405, S411, S412 and S404.

The candidate rule extracting portion 221 refers to the primary data management table 246 to acquire the primary data that is obtained by each sensor device and that is included in the processing logic data. For example, since the processing logic data corresponding to the value "L1" of logic ID 1110 includes the primary data obtained by the sensor devices "S1" and "S2", the portion 221 refers to the primary data management table 248 to acquire the tag identification information "1" "2" "3" corresponding to the value "S1" of device ID 1010 and the information "2" "3" corresponding to the value "S2" of device ID 1010 (S406).

The data processing portion 212 generates processed data by using the primary data acquired in the previous step 406 and the formula 930 acquired in step 402. Since the tag identification information are acquired from the sensor devices "S1" and "S2" in the previous step, the logical sum "1" "2" "3" and logical product "2" "3" are estimated by using the obtained tag information. Then, the results are substituted into the formula "logical product/logical sum×100" to produce the value "66" of processed data (S407).

It is now considered that another sensor device "S3", though not shown in table 246 of FIG. 10, is provided to obtain tag identification information "2" "3" "4" which is stored in the table 246.

Since the tag information acquired from sensor device "S1" is "1" "2" "3", the logical sum and logical product of the group of (S1, S3) can be found as "1" "2" "3" "4" and as "2" "3", and thus "50" can be produced from the formula "logical product/logical sum×100".

In addition, if three ones of the four sensor devices registered in the device management table 244 are combined so that the combination device number 722 in the table 243 is changed to 3, $_4C_3=4$ rules are extracted from the data. Specifically, the extracted four rules are (S1, S2, S3), (S1, S2, S4), (S1, S3, S4) and (S2, S3, S4). In order to find the value, or overlap ratio of tag ID for the rule of the group (S1, S2, S3), the portion 212 estimates the union of sets of the tag identification information acquired from the sensor devices S1~S3, and the product set of the overlaps of the tag identification information of S1~S3, and it calculates the product set/union of sets×100.

For example, as in the previous example, it is assumed that the sensor devices "S1", "S2" and "S3" acquire "1" "2" "3", "2" "3" and "2" "3" "4", respectively.

In this case, the overlap ratio of 50% can be calculated from the ratio of the product set "2" "3" of the individual identification information, or tag information acquired from a plurality of sensor devices S1, S2 and S3 relative to the union of sets "1" "2" "3" "4" of the tag information acquired from the plurality of sensor devices.

The data processing portion 212 generates "D1" of data ID 1210 unique within the processed data management table 248, and registers it in the table 248 together with the logic ID 1220, or "L1" used to process data and with the value "66" of the processed data produced in the previous step (S408).

The values 1230 of processed data management table 248 are updated as the latest overlap ratios at constant intervals or at all times.

The candidate rule extracting portion 221 causes the processing logic management data produced in step 404 to be registered in the processing logic management table 247 (S409).

The candidate rule extracting portion 221 also causes the values of the logic ID and processed data used to produce values in step 408 to be registered in the candidate rule management table 249. For example, the "L1" of logic ID and processed data value "66" are registered in the candidate rule management table 249 (S410).

Figure 5:
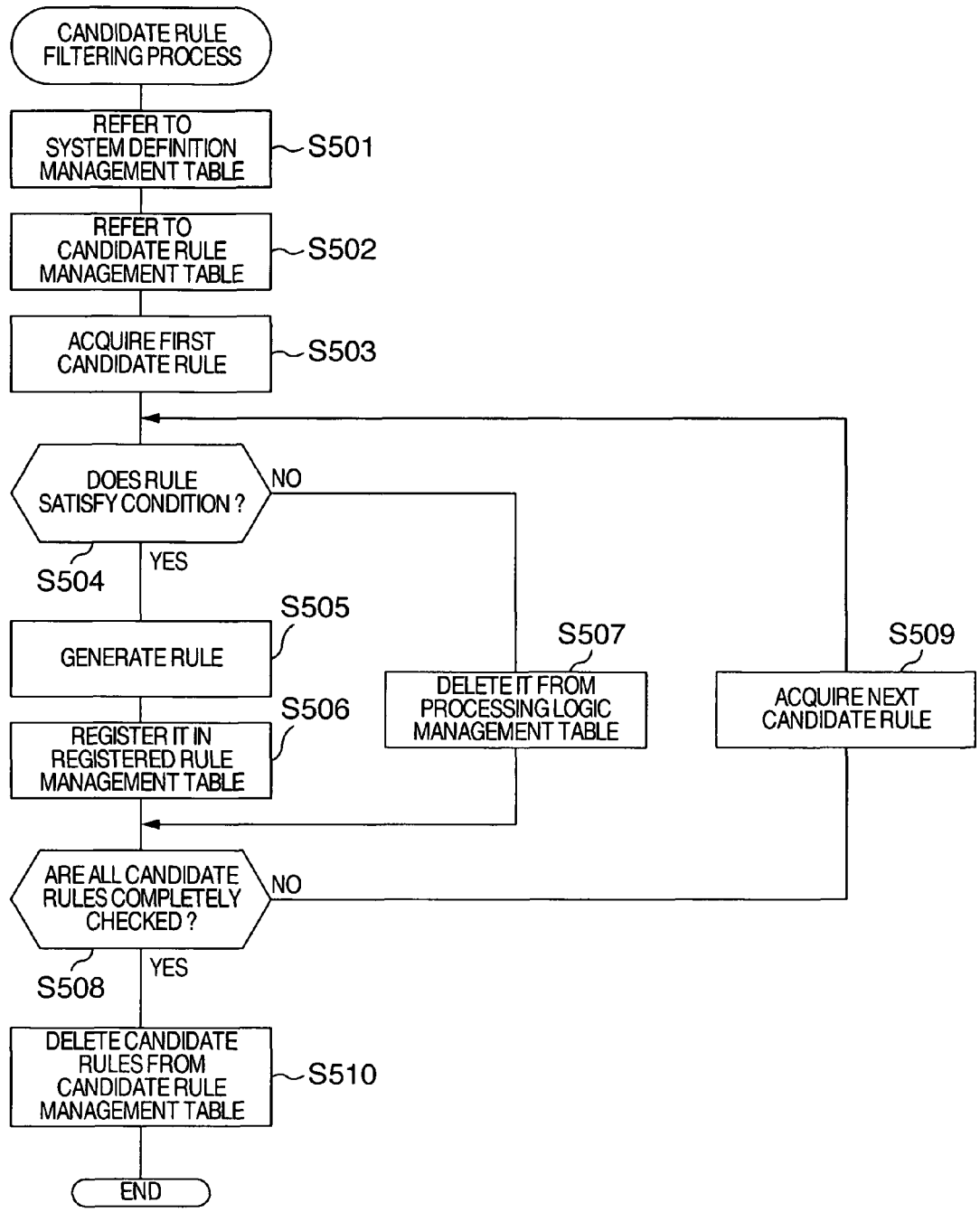
FIG. 5 is an example of the flowchart for a candidate rule filtering process.

FIG. 5 shows an example of the flowchart for the candidate rule filtering process that corresponds to S320 in FIG. 3. The candidate rule filtering portion 222 provides steps of S501 through S510.

The candidate rule filtering portion 222 refers to the system definition management table 243 to acquire the definition value "±5%" of data allowance 723 and the definition value "overlap of 30% or more" of rule forming condition 724 (S501).

The allowance 723 of acquired data is used for the candidate rule filtering portion 222 to produce each rule with an allowance. Since the sensor devices cannot always acquire the same data under the change of environment, this allowance value is specified when the acquired data is fluctuating.

When X represents the value calculated at the time of rule extraction and Y the allowance 723 of data, the data for the rule is monitored to see if it is within the range from X−Y to X+Y. The allowance 723 of data is set to be larger than 0, but to be the smaller, the higher the precision of the sensor devices used in the system. When high-precision sensor devices are used, the allowance may be "0" % or does not need to be specified.

The rule forming condition 724 is used to narrow down the range of the candidate rules produced by the candidate rule extracting portion 221. For example, the filtering or screening of candidate rules is performed by judging whether the value "66" (that indicates overlaps of 66%) corresponding to the "CR1" of candidate rule ID 1310 meets the rule forming condition "overlaps of 30% or more". While a single rule forming condition is used in this embodiment, a plurality of conditions may be specified. In addition, when a plurality of conditions are specified, rules may be selected when satisfying all conditions or when satisfying only any one of the conditions.

The candidate rule filtering portion 222 refers to the candidate rule management table 249 to acquire candidate rules (S502). The portion 222 executes the steps of S504~S507 repeatedly for each of the acquired rules by the number of times corresponding to the number of candidate rules acquired in the previous step until it is fund through the steps of S503, S508 and S509 that all the candidate rules have completely underwent.

That is, judgment is made of whether each of the candidate rules successively acquired in the previous step satisfies the value "overlap of 30% or more" of the rule forming condition 724 acquired in step S501 (S504). If it satisfies the condition, the filtering program goes to step S505. If it does not satisfy the condition, the program goes to step S507. For example, since the "CR1" of candidate rule ID 1310 corresponds to the value "66" in the candidate rule management table of FIG. 13, it satisfies the rule forming condition of "30% or more", and thus the processing goes to step S505. In addition, since the "CR3" of candidate rule ID 1310 corresponds to the value "0", it does not satisfy the condition, and thus the processing goes to step 507.

The candidate rules that satisfy the rule forming condition 724 are produced as rules. In this case, the values 1330 are processed according to the value "±5%" of data allowance 723 and registered as values 1430. For example, the value "66" corresponding to the "CR1" of candidate rule ID 1310 is processed as "61~71" (S505).

The rule ID 1410 unique within the registered rule management table 250 are generated and registered in the table 250 together with the values produced in the previous step. For example, when the portion registers the rule corresponding to the "CR1" of candidate rule ID 1310, it generates "R1" of rule ID 1410 and register this rule ID in the registered rule management table 250 together with the "L1" of logic ID and the value of "61~71" (S506).

The processing logic ID corresponding to the candidate rules that were found not to satisfy the rule forming condition 724 from the values of logic ID 1320 are deleted from the processing logic management table 247. For example, since the value, "0" corresponding to the "CR3" of candidate rule ID 1310 does not satisfy the value of "overlaps of 30% or more" of rule forming condition 724, the processing logic data 1113 corresponding to the value "L3" of logic ID 1320 associated with the "CR3" is deleted from the processing logic management table 247 (S507).

The portion deletes all unacceptable candidate rules from the candidate rule management table 249, and thus generates the registered rule management table 250 (S510). Thus, a plurality of sensor devices are grouped, and the groups of which the overlap ratios of tag ID satisfy a predetermined condition are extracted, or filtered from all possible groups as the rules to be monitored. In other words, of the plurality of sensor devices, ones that acquire redundant tab information with the overlap ratios satisfying a predetermined condition are extracted as groups and monitored.

The rule monitoring portion 231 checks if the data produced from the sensor devices and stored in the primary data management table becomes abnormal on the basis of the rules stored in the registered rule management table 250, or monitors the sensor devices to see if they become abnormal according to the rules. When any one of the devices is found to be abnormal, the rule monitoring portion 231 notifies the user of the abnormality by using the user notifying portion 232. In addition, when more than a predetermined number of rules change not to satisfy the condition, the candidate rule extracting portion 221 and candidate rule filtering portion 222 are invoked and caused to again extract rules.

The user notifying portion 232 is invoked when the rule monitoring portion 231 finds an abnormal sensor device, and it is caused to notify the user or supervisor by using, for example, e-male or system log. At this time, the user or supervisor is notified of things such as the occurrence of abnormality in sensor devices, an abnormal sensor device, a rule not satisfying the condition, the re-extraction of rules if necessary and a sensor device group not satisfying the condition. This notice is sent to a terminal such as a computer or a cell phone that the user, maintenance worker or supervisor uses.

Figure 6:
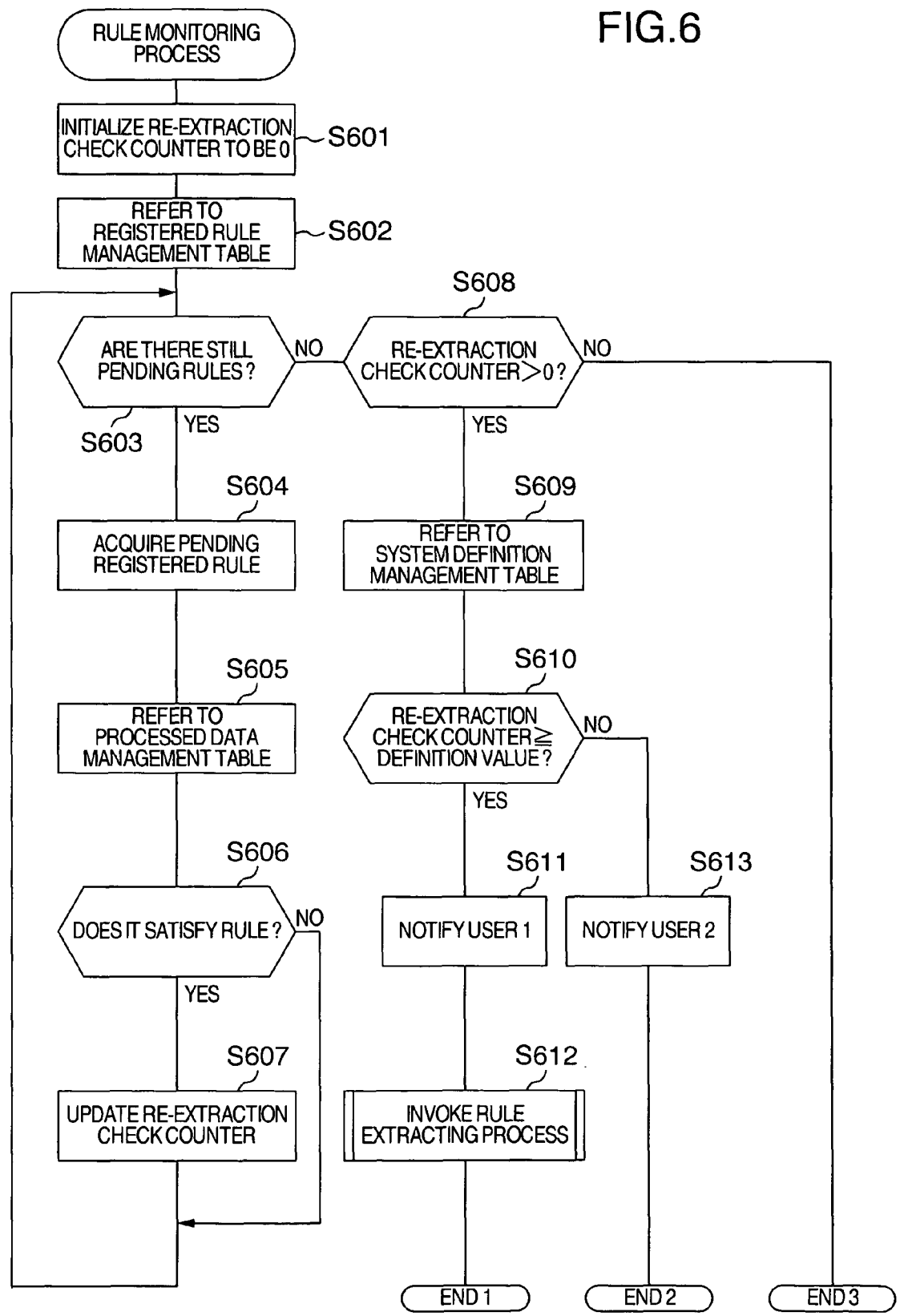
FIG. 6 is an example of the flowchart for a rule monitoring process.

FIG. 6 shows an example of the flowchart for the rule monitoring process. The rule monitoring portion 231 provides steps of S601 through S610 and step of S612, and the user notifying portion 232 provides steps of S611 and S613.

The rule monitoring portion 231 initialize the re-extraction check counter at 0. The re-extraction check counter is the counter that counts the number of failed rules and that takes values of 0 or more (S601).

The portion refers to the registered rule management table 250 to acquire the rule ID 1410 of registered rules, logic ID 1420 and values 1430, and it holds them. For example, it acquires rule ID "R1", logic ID "L1" and value "61~71". At this time, it also acquires the total number of rules registered in the registered rule management table 250. The total number of rules in the registered rule management table 250 shown in FIG. 14 is "4" (S602).

The registered rules obtained in the previous step undergo steps S603 and S604 and they are processed in the steps S603 through S07.

The rule monitoring portion 231 acquires the values of processed data corresponding to the logic ID 1420 of registered rules from the processed data management table 248. For example, the value of processed data corresponding to the rule ID "R1" is obtained from the value "66" corresponding to the "L1" of logic ID 1220 of the processed data management table 248 (S605).

The values 1230 of this processed data management table 248 are updated into the latest status at regular intervals or at all times. The values 1230 of overlap ratio are changed by the condition of sensor devices and by the movement of REID tags. Since the sensor devices have directivity, the values 1230 of overlap ratio change even when the orientation of sensor devices are changed.

The overlap ratio is calculated on the basis of the processed data that is updated into the latest status at regular intervals or at all times as in the previous step, and compared with that of the registered rule in order to check if it satisfies the condition. If it satisfies the condition, the step S603 is executed. If it does not satisfy the condition, the S607 is executed to update the re-extraction check counter and then the step S603 is executed (S606).

For example, since the value corresponding to the "R1" of the rule ID 1410 is "61~71" while the value corresponding to logic ID "L1" in the table 248 is "66", this rule R1 satisfies the condition, and thus the program goes to step S603. If the value corresponding to data ID "D1" in the processed data management table 248 is changed to "50" depending upon the status of sensor devices or movement of RFID tags, this rule does not satisfy the condition "61~71", and thus the program goes to step S607 where the re-extraction check counter is incremented by 1.

Here, the judgment of whether the rule meets the condition is not performed once but it may be performed a plurality of times at regular intervals. In addition, the judgment may be made again after lapse of a certain time.

The user notifying portion 232 notifies the user of the possibility that a device level error has occurred in the readers constituting the rule. For example, when the rule of ID 1410 "R1" of registered rule management table 250 do not satisfy the condition, the sensor devices "S1", "S2" corresponding to the value "L1" of logic ID 1420 are acquired from the processing logic management table 247, and the user is notified of the possibility that a device level error has occurred in these sensor devices (S613).

In this case, it is assumed that the sensor device S1 has failed to cause a device level error and thus cannot acquire individual identification information from the tags. The devices in which the device level error has occurred are supposed to be "S1" and "S2". In addition, the present status of the primary data management table 246 is acquired about the S1 and S2. Thus, it can be known that the device S2 can normally acquire information but device S1 cannot acquire the information. From this fact, it is found that the device S1 has failed.

When the numbers of RFID tags and sensor devices are tremendously large, the range of possible sensor device groups that do not satisfy the rules is narrowed down, and then the sensor devices of each of the groups in which the device level error has occurred can be detected by examining the present situation of whether the devices are normally acquiring the information with reference to the primary management table.

The user is notified of the sensor devices of a group found after the above narrowing-down operation, so that the user or supervisor can know which sensor device has failed.

In addition, it is assumed that the sensor device S1 is greatly changed in its orientation when the rules R1, R2, R3, R4, R5, R6 of device combinations (S1, S2), (S1, S3), (S1, S4), (S2, S3), (S2, S4), (S3, S4) are being monitored by using the registered rule management table 250. In this case, only the rules R1, R2 and R3 of the groups including the sensor device S1 do not satisfy the values 1430 of the registration rule management table.

The monitoring side will see that the rules R1, R2 and R3 suddenly do not satisfy the values. In this case, the groups (S1, S2), (S1, S3), (S1, S4) of sensor devices corresponding to the rules R1, R2 and R3 are obtained from the processing logic management table, and the sensor device S1 that redundantly exists in all groups is extracted from the groups. Then, the device S1 is considered to have caused a trouble, have changed its orientation or have failed as a device level error, and thus this defective sensor device can be pinned down. Subsequently, the user or supervisor is notified of the fact that error has occurred in this hunted-down sensor device.

In the process step S608 for the re-extraction check counter, the content of the re-extraction counter is checked. If the content is larger than "0", the program goes to step S608. If the content is "0", the program ends (S608).

The value "60% or more not satisfying" of reconstructing condition 725 is acquired by referring to the system definition management table 243 (S609).

The number of invalid rules that need the re-extraction of rules is estimated from the total number of rules acquired in step S602 and the reconstructing condition 725 (60% or more not satisfying" acquired in the previous step. For example, since the total number of rules currently monitored and the value of reconstructing condition 725 are respectively "4" and "60% or more not satisfying" in the registration rule management table shown in FIG. 14, the number of invalid rules that need the re-extraction of rules is 4×60%, or 3 when counting fractions as one (S610). In other words, re-extraction of rules shown in FIG. 3 is performed when 3 or more ones of the currently monitored rules R1~R4 do not satisfy the values 1430.

The number of the invalid rules found above is compared with the content of the re-extraction check counter. If the content of the counter is larger, the program goes to step S611. If the content of the counter is smaller, the program goes to step S613.

The user notifying portion 232 notifies the user of the fact that rules are about to be reconstructed by using e-male or system log (S611).

The rule monitoring portion 231 invokes the above-mentioned rule extracting process of the steps S310 and S320 (S612).

If a plurality of rules do not satisfy the values at a time to exceed the value of reconstruction condition 725, the re-extraction of rules shown in FIG. 3 is performed.

It is considered that the construction of this embodiment is applied to the case of laying out a plurality of articles with RFID tags as shown in FIG. 1. If four sensor devices are used to manage the RFID tags attached to several hundreds of articles, the rules R1, R2, R3, R4, R5, R6 of the list of device combinations (S1, S2), (S1, S3), (S1, S4), (S2, S4) and (S3, S4) are used to monitor the tag identification information acquired from several hundreds of RFID tags.

If, now, the sensors (S1, S2) of rule R1 are used to monitor 100 RFID tags as logical sum and obtain an overlap ratio of 70% of tag information between S1 and S2, both the sensors S1 and S2 redundantly monitor 70 like pieces of identification information. At this time, even if five ones of these 70 articles are sold with the result that the tag identification information of 5 RFID tags disappear from the 70 pieces of tag identification information redundantly monitored, the overlap ratio is almost not changed from the original 70% because the remaining 65 RFID tags of the total number of 95 RFID tags currently monitored are still redundantly monitored so that the new overlap ratio is computed as 65/95×100=68.4.

Thus, even if the total number of RFID tags is changed due to the disappearance of some articles sold, the overlap ratio is still kept within the range of the value 1430 monitored on the registered rule management table with the result that no device level error is not detected. On the other hand, as described above, if a certain sensor device causes the device level error, the overlap ratio does not satisfy the value in this registered rule management table, thus the user being notified of the error.

Thus, when several hundreds of RFID tags are monitored, the change of the overlap ratio between the sensors of each of the groups is used to monitor the device level error. Therefore, even if some change occurs in several hundreds of REID tags themselves, only the change of operation of sensor devices can be detected without the influence of the change of the number of RFID tags.

In addition, it is assumed that the layout of several hundred of RFID tags is often changed as layouts 150, 160 and 170 shown in FIG. 1 while those tags are being monitored. In this case, if the layout of exhibited articles with those tags is greatly changed, all the rules R1 through R6 do not satisfy the values 1430 of registered rule management table 250. Thus, if the rules of which the number exceeds the value of reconstructing condition 1725 of the system definition management table 243 do not satisfy the values 1430 at a time, it can be considered that a factor of a significant change of layout or the like has occurred. The reconstruction of rules shown in FIG. 3 is performed, making it possible to again manage the rules registered for the new layout.

When large numbers of articles with RFID tags are changed in their positions while they are being managed, the groups of sensor devices are produced and managed as in this embodiment. Thus, the sensor devices are properly regrouped in accordance with the situations in which the articles are moved, changed or lost, and thus the device level error can be detected.

In the apparel business and market in which the layout of articles is changed every morning, the supervisor purposely does not need to set the RFID tags to be monitored, but the grouping of sensor devices that acquire the tag information is automatically made every morning so that the sensor devices can be monitored.

If a portion to identify a physical position is provided in each of the sensor devices, the maintenance worker is notified of the sensor device that has caused the device level error and of which the position is identified, so that the worker can get to the place of this sensor device and repair the device. When several hundreds of sensor devices are provided, the portion to detect the position of device is provided in part of the sensor devices, or provided in each group of sensor devices. Thus, since the maintenance worker is notified of the sensor device with this position-detectable portion provided that is included in a group of sensor devices in which the device level error has occurred, the worker can get to the place of this sensor device.

Since the sensor device that has caused the device level error belongs to the same group as that of the sensor device with the position-detectable portion, the maintenance worker can find the error-caused device by examining the devices existing around the device with this portion. Thus, when the position-detectable portion is provided in only part of the sensor devices, the cost is reduced because such a portion does not need to provide in all the devices.

When sensor devices capable of identifying their own physical positions are provided as part of the devices, the sensor devices capable of identifying their own positions are combined with other normal sensor devices with no such portions and grouped so that the overlap ratios between those sensor devices in each group can be set to be more than a predetermined value. Thus, the sensor devices are grouped so that each of such portion-provided sensor devices can be included in each of the groups. In this case, if the locations of those sensor devices with such portion are displayed on the GUI of the management terminal together with the physical layouts, the supervisor can easily check on the GUI the place of any group that has caused the device level error and thus that does not satisfy the condition.

In addition, while the user notifying portion in this embodiment notifies the user of things, it may notify the maintenance worker who changes the sensor devices or the supervisor who remotely monitors the sensor devices. Moreover, while the notifying means in the user notifying portion is e-mail or system log in this embodiment, it may be an alert or pop-up window on the GUI of a terminal such as a computer or cell phone used by the supervisor or may be a patrol lump or buzzer.

While the re-extraction of rules is made when the rules become invalid to exceed a predetermined rate in this embodiment, it may be made under any one of the conditions that more than a predetermined number of rules have become invalid, that the number of rules that have become invalid within a predetermined time exceeds a predetermined number and that predetermined rules have become invalid by a certain number of times or more. The system management table 243 holds the values of these predetermined number and predetermined time as the basic values for those conditions.

Embodiment 2

A modification of the first embodiment will be described with reference to FIG. 15. The descriptions in the first embodiment will be properly used to assist in describing the embodiment 2. The feature of this embodiment resides in a method of generating primary data to be acquired in the candidate rule extracting process.

The data to be used for the extraction of rules in the first embodiment is the data that the sensor devices acquired at certain timing points. When the sensor devices acquire the data at certain timing points, the system might be not kept in good condition depending upon the change of environment.

Figure 15:
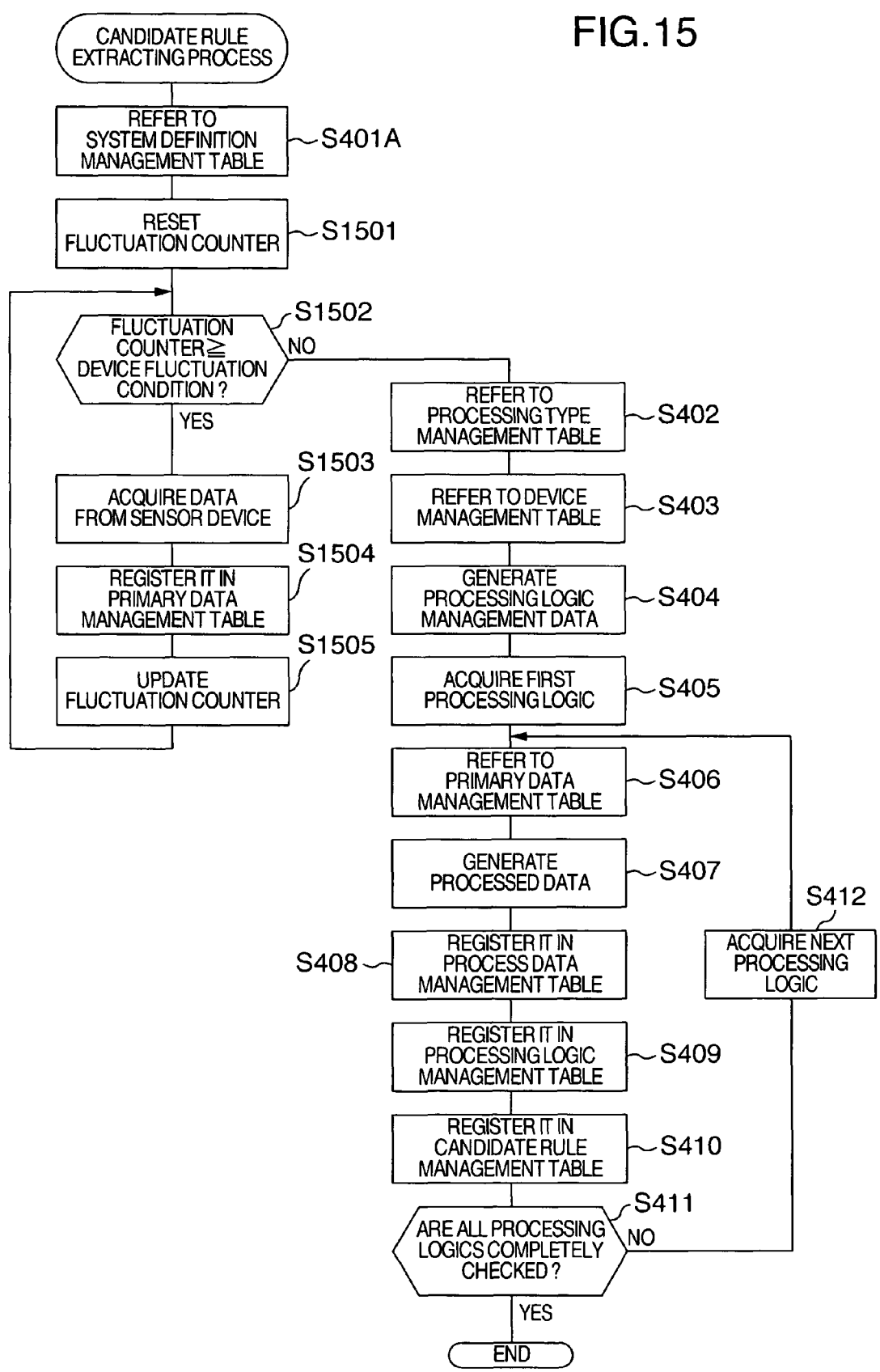
FIG. 15 is an example of the flowchart for the rule extracting process considering a device fluctuation condition.

FIG. 15 is a flowchart of the candidate rule extracting process considering that the data acquired by the sensor devices has a fluctuation with time. Here, the candidate rule extracting portion 221 provides steps of S401A, S1501, S1502, S402~S406, and S409~S412. The data processing portion 212 provides steps of S407 and S408. The data acquiring portion 211 provides steps of S1503 and S1504.

The candidate rule extracting portion 221 refers to the system definition management table 243 to acquire a device fluctuation condition 726 in addition to the processing type 721, combination device number 722 and data allowance 723 (S401A).

The device fluctuation condition 726 is the condition in which the sensor devices accurately acquire the data. This condition may be a predetermined time or a predetermined number of times. This embodiment assumes the case when the sensor devices can accurately acquire the data in a predetermined time. For example, the value of the device fluctuation condition 726 is defined as "all data is to be acquired in 180 seconds" assuming that all the individual identification information, or tag information can be read out in 3 minutes.

A fluctuation counter is initialized to be zero. The fluctuation counter indicates the current value of the device fluctuation condition, and takes a value of 0 or above (S1501).

Then, judgment is made of whether the content of the fluctuation counter satisfies the predetermined device fluctuation condition 726 (S1502). If it satisfies the condition 726, the step S402 is executed. If it does not satisfy, the steps of S1503 and S1504 are executed. If the device fluctuation condition 726 is "all data is to be acquired in 180 seconds", the steps of S1503 and S1504 are executed until time of 180 seconds elapses from the start of data acquisition.

The data acquiring portion 211 acquires data from the sensor devices of the system (S1503).

The data acquired in the previous step is registered in the primary data management table 246 (S1504). When the data is registered, it may be overwritten on the existing data or may be registered separately at each timing point of acquisition.

In order to register data separately at each timing point of acquisition, processed data is generated that considers the device fluctuation condition, or the fluctuation of the tag identification information acquired by the sensor devices as shown in FIG. 16. The minimum values 1640 hold the minimum values of data acquired until the fluctuation condition is satisfied. The maximum values 1650 hold the maximum values of data similarly acquired until the fluctuation condition is satisfied.

The rules considering the device fluctuation condition can be produced as shown in FIG. 17 by using the processed data having the maximum and minimum values to thereby estimate the allowance of the maximum value+data and the allowance of the minimum value-data.

In step S1505, the content of the fluctuation counter is updated, and the program goes back to step S1502.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sensor device management system that manages a plurality of sensor devices that acquires individual identification information from individual identifiers, said sensor device management system comprising:
 a data-acquiring portion that acquires said individual identification information from said plurality of sensor devices;
 a storage portion that stores primary information that is produced by associating said sensor devices with said individual identification information acquired by said sensor devices;

an extracting portion constructed so that said sensor devices that satisfy a predetermined condition can be extracted as a group on the basis of said identification information acquired by said plurality of sensor devices of said primary information; and a monitoring portion that monitors said sensor devices to check if the sensor devices belonging to said extracted group satisfy said predetermined condition;

wherein said predetermined condition is the condition in which the overlap rate of a plurality of pieces of said individual identification information associated with said plurality of sensor devices of said primary information is a predetermined value or more; and wherein said overlap rate is the ratio of the product set of said individual identification information associated with said plurality of sensor devices to the union of sets of said individual identification information associated with said plurality of sensor devices.

2. A sensor device management system that manages a plurality sensor devices that acquires individual identification information from individual identifiers, said sensor device management system comprising:

a data-acquiring portion that acquires said individual identification information from said plurality of sensor devices;

a storage portion that stores primary information that is produced by associating said sensor devices with said individual identification information acquired by said sensor devices;

an extracting portion constructed so that said sensor devices that satisfy a predetermined condition can be extracted as a group on the basis of said identification information acquired by said plurality of sensor devices of said primary information; and a monitoring portion that monitors said sensor devices to check if the sensor devices belonging to said extracted group satisfy said predetermined condition;

wherein:

said group has a plurality of groups, said monitoring portion judges whether the ratio of the number of groups that do not satisfy said predetermined condition to the number of said plurality of groups is a predetermined value or more, and if said ratio is judged to be a predetermined value or more, said extracting portion re-extracts said plurality of sensor devices as groups that satisfy said predetermined condition.

3. A sensor device management system that manages a plurality sensor devices that acquires individual identification information from individual identifiers, said sensor device management system comprising:

a data-acquiring portion that acquires said individual identification information from said plurality of sensor devices;

a storage portion that stores primary information that is produced by associating said sensor devices with said individual identification information acquired by said sensor devices;

an extracting portion constructed so that said sensor devices that satisfy a predetermined condition can be extracted as a group on the basis of said identification information acquired by said plurality of sensor devices of said primary information; and a monitoring portion that monitors said sensor devices to check if the sensor devices belonging to said extracted group satisfy said predetermined condition;

wherein:

said data acquiring portion acquires said individual identification information a plurality of times from said plurality of sensor devices during a predetermined period of time, said storage portion stores, a plurality of times, said primary information of said sensor devices associated with said individual identification information acquired a plurality of times from said sensor devices, and said extracting portion extracts said sensor devices as a group that satisfy said predetermined condition on the basis of said plurality of pieces of primary information;

wherein the process to extract said sensor devices as a group that satisfy said predetermined condition from said plurality of sensor devices on the basis of said plurality of pieces of primary information is the process that extracts said sensor devices as a group that satisfy said predetermined condition from said plurality of sensor devices on the basis of the average value of said plurality of pieces of primary information.

4. A sensor device managing method for managing a plurality of sensor devices that acquire individual identification information from individual identifiers, said method comprising the steps of:

generating primary information of said sensor devices associated with said individual identification information acquired from said sensor devices;

extracting the sensor devices as a group that satisfy a predetermined condition on the basis of the identification information acquired by said plurality of sensor devices of said primary information; and monitoring said sensor devices to check if the sensor devices of said extracted group satisfy said predetermined condition;

wherein said predetermined condition is the condition in which the overlap rate of said plurality of pieces of said individual identification information associated with said plurality of sensor devices of said primary information is a predetermined value or above; and wherein said overlap rate is the ratio of the product set of said individual identification information associated with said plurality of sensor devices to the union of sets of said individual identification information associated with said plurality of sensor devices.

5. A sensor device managing method for managing a plurality of sensor devices that acquire individual identification information from individual identifiers, said method comprising the steps of:

generating primary information of said sensor devices associated with said individual identification information acquired from said sensor devices;

extracting the sensor devices as a group that satisfy a predetermined condition on the basis of the identification information acquired by said plurality of sensor devices of said primary information; and monitoring said sensor devices to check if the sensor devices of said extracted group satisfy said predetermined condition;

wherein:

said group has a plurality of groups, said monitoring portion judges whether the ratio of the number of groups not satisfying said predetermined condition to the number of said plurality of groups is a predetermined value or more, and if the ratio is judged to be said predetermined value or more, said extracting portion re-extracts said sensor devices as groups that satisfy said predetermined condition from said plurality of sensor devices.

6. A sensor device managing method for managing a plurality of sensor devices that acquire individual identification information from individual identifiers, said method comprising the steps of:

generating primary information of said sensor devices associated with said individual identification information acquired from said sensor devices;

extracting the sensor devices as a group that satisfy a predetermined condition on the basis of the identification information acquired by said plurality of sensor devices of said primary information; and monitoring said sensor devices to check if the sensor devices of said extracted group satisfy said predetermined condition;

wherein:

said generation of said primary information is that a plurality of pieces of said primary information of said sensor devices associated with said individual identification information acquired by said sensor devices are generated on the basis of said individual identification information acquired a plurality of times from said plurality of sensor devices during a certain period of time;

said extracting step is that the sensor devices that satisfy said predetermined condition are extracted as a group from said plurality of sensor devices on the basis of said plurality of pieces of said primary information; and said extracting step in which said sensor devices that satisfy said predetermined condition are extracted as a group from said plurality of sensor devices on the basis of said plurality of pieces of said primary information is the process in which said sensor devices that satisfy said predetermined condition are extracted as a group from said plurality of sensor devices on the basis of the average value of said plurality of pieces of said primary information.

* * * * *